(12) United States Patent
Li et al.

(10) Patent No.: US 10,402,738 B2
(45) Date of Patent: Sep. 3, 2019

(54) BAYESIAN NONPARAMETRIC METHOD FOR INFRASTRUCTURE FAILURE PREDICTION

(71) Applicant: NATIONAL ICT AUSTRALIA LIMITED, Eveleigh, NSW (AU)

(72) Inventors: Zhidong Li, Eveleigh (AU); Yang Wang, Eveleigh (AU); Fang Chen, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 479 days.

(21) Appl. No.: 14/649,449

(22) PCT Filed: Dec. 2, 2013

(86) PCT No.: PCT/AU2013/001395
§ 371 (c)(1),
(2) Date: Jun. 3, 2015

(87) PCT Pub. No.: WO2014/085849
PCT Pub. Date: Jun. 12, 2014

(65) Prior Publication Data
US 2015/0310349 A1    Oct. 29, 2015

(30) Foreign Application Priority Data

Dec. 3, 2012 (AU) .................... 2012905251
Dec. 21, 2012 (AU) .................... 2012905633

(51) Int. Cl.
*G06N 7/00* (2006.01)
*G06Q 50/06* (2012.01)
(Continued)

(52) U.S. Cl.
CPC ............. *G06N 7/005* (2013.01); *G06Q 10/04* (2013.01); *G06Q 50/06* (2013.01); *G06Q 50/08* (2013.01); *G06N 7/00* (2013.01)

(58) Field of Classification Search
None
See application file for complete search history.

(56) References Cited

U.S. PATENT DOCUMENTS 6,496,814 B1   12/2002 Busche
6,556,924 B1    4/2003 Kariyawasam et al.
(Continued)

OTHER PUBLICATIONS

Burda, et al., A Bayesian Semiparametric Competing Risk Model with Unobserved Heterogeneity, Journal of Applied Econometrics 30, No. 3, 2014, pp. 353-376.*
(Continued)

*Primary Examiner* — Wilbert L Starks (57) ABSTRACT

The present invention generally relates to failure prediction of an infrastructure (110). A failure likelihood for one or more components of an infrastructure (110) is determined. History data (210) representing prior failures of the components of the infrastructure (110) is applied (230-250) to a Bayesian nonparametric statistical model using a beta process. Then the failure likelihood of one or more components of the infrastructure from the Bayesian nonparametric statistical model is estimated (270). Aspects of the invention include computer-implemented methods (200, 300), software and computer systems (100).

13 Claims, 4 Drawing Sheets

(51) Int. Cl.
*G06Q 50/08* (2012.01)
*G06Q 10/04* (2012.01)

(56) References Cited

U.S. PATENT DOCUMENTS 8,529,947 B2 9/2013 West et al.
2004/0083084 A1 4/2004 West

OTHER PUBLICATIONS

Burda, et al., A Bayesian Semiparametric Competing Risk Model with Unobserved Heterogeneity, Journal of Applied Econometrics 30, No. 3, 2014, pp. 353-376 (Year: 2014).*
NICTA Intelligent pipes, Intelligent Pipes Infrastructure, Transport and Logistics, nicta.com.au/research/projects/intelligent_pipes, Jul. 2014, 1 page.
Thibaux et al., Hierarchical Beta Processes and the Indian Buffet Process, University of California, Berkeley, Nov. 2006, 8 pages.
Belyi, D. et al, Bayesian Non-Parametric Simulation of Hazard Functions, Proceedings of the 2009 Winter Simulation Conference, Dec. 2009, Austin, Texas, pp. 475-482.
The, Y. W. et al, Hierarchical Bayesian Nonparametric Models with Applications, Bayesian Nonparametrics: Principles and Practice, Cambridge University Press, 2010, pp. 1-47.
Walker, S. G. et al., Bayesian Nonparametric Inference for Random Distributions and Related Functions, Journal of the Royal Statistical Society, Series B, vol. 61, Issue 3, 1999, pp. 485-527.
Arjas, E. et al., Nonparametric Bayesian Inference from Right Censored Survival Data, using the Gibbs Sampler, Statistica Sinica, 4, 1994, pp. 505-524.
Polpo, A. et al., Reliability Nonparametric Bayesian Estimation in Parallel Systems, IEEE Tranactions on Reliability, vol. 58, No. 2, Jun. 2009, pp. 364-373.
Rodriguez, A., Some Advances in Bayesian Nonparametric Modeling, Duke University, 2007, pp. 1-198.

* cited by examiner

Table 1: exemplary data structure of prior failures

|        | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|--------|---|---|---|---|---|---|---|---|---|----|----|----|----|----|----|----|----|----|----|----|----|----|----|----|
| Comp 1 | 0 | 0 | 0 | 0 | 0 | 0 | 0 | 1 | 0 | 0  | 0  | 0  | 0  | 0  | 0  | 0  | 0  | 0  | 0  | 0  | 0  | 0  | 0  | 0  |
| Comp 2 | 0 | 0 | 0 | 0 | 0 | 0 | 0 | 0 | 0 | 0  | 0  | 1  | 0  | 0  | 0  | 0  | 0  | 0  | 0  | 0  | 0  | 0  | 0  | 0  |
| ...    |   |   |   |   |   |   |   |   |   |    |    |    |    |    |    |    |    |    |    |    |    |    |    |    |
| Comp n | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  |

FIG. 4

Table 2: numerical estimate for failure likelihood of component $(i,j)$ with fixed concentration parameter Input: component failure history data $\{z_{k,i,j}\}, k = 1, \ldots, K, i = 1, \ldots, n_k, j = 1, \ldots, m_{k,i}$; hyper parameters $c_0$ and $q_0$; concentration parameters $\{c_k\}$.
Output: The estimation of failure probability $\pi_{k,i}$ for each component.
for $t = 1, 2, \ldots, T$,
  sample $q_k^{(t)}$ from $p(q_k | z_{k,1:n_k})$;
  $\pi_{k,i}^{(t)} = \frac{c_k q_k^{(t)} + \sum_j z_{k,i,j}}{c_k + m_{k,i}}$;
end for
calculate $\bar{\pi}_{k,i} = \frac{1}{T} \sum_{t=1}^{T} \pi_{k,i}^{(t)}$;
return $\bar{\pi}_{k,i}$

FIG. 5

Table 3: numerical estimate for failure likelihood of component $(i,j)$ without fixed mean and concentration parameters Input: component failure history data $\{z_{k,i,j}\}, k = 1, \ldots, K, i = 1, \ldots, n_k, j = 1, \ldots, m_{k,i}$; hyper parameters $c_0$ and $q_0$;
Output: The estimation of failure probability $\pi_{k,i}$ for each component.
for $t = 1, 2, \ldots, T$,
  sample $c_k^{(t)}$ and $q_k^{(t)}$ from (10) with $q_k = \frac{c_0 q_0 + \sum_i s_{k,i}}{c_0 + \sum_i s_{k,i} + \sum_i \sum_{l=0}^{m_{k,i}-1-s_{k,i}} \frac{c_k}{l+c_k}}$;
  $\pi_{k,i}^{(t)} = \frac{c_k^{(t)} q_k^{(t)} + \sum_j z_{k,i,j}}{c_k^{(t)} + m_{k,i}}$;
end for
calculate $\bar{\pi}_{k,i} = \frac{1}{T} \sum_{t=1}^{T} \pi_{k,i}^{(t)}$;
return $\bar{\pi}_{k,i}$.

FIG. 6

BAYESIAN NONPARAMETRIC METHOD FOR INFRASTRUCTURE FAILURE PREDICTION

CROSS-REFERENCE TO RELATED APPLICATIONS

The present application claims priority from the Australian provisional application 2012905251 filed on 3 Dec. 2012 and Australia provisional application 2012905633 filed on 20 Dec. 2012 with National ICT Australia being the applicant of both and the contents of which are incorporated herein by reference.

TECHNICAL FIELD

The present invention generally relates to failure prediction of an infrastructure. Aspects of the invention include computer-implemented methods, software and computer systems.

BACKGROUND

Failures of a critical infrastructure, such as a water supply system, typically cause severe consequences and negative economic and social impacts due to service interruptions. As a result, operators of the infrastructure, e.g., utilities, undertake preventative repairs and renewal which carry much lower costs. The service lives or conditions of components constituting the infrastructure can vary dramatically depending on local conditions such as manufacturing and surrounding environment.

Risk prediction based management approaches predict high risk components that are then manually inspected to confirm their actual condition, before finally deciding on whether to renew them.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

There is provided a computer-implemented method for estimating failure likelihood of one or more components of an infrastructure, comprising:
  accessing or receiving history data representing prior failures of the components of the infrastructure;
  applying the history data to a Bayesian nonparametric statistical model using a beta process; and
  estimating the failure likelihood of one or more components of the infrastructure from the Bayesian nonparametric statistical model.

It is an advantage that the present invention adopts the Bayesian nonparametric statistical model using machine learning to estimate the failure likelihood of components of an infrastructure, which avoids assumptions on the structure of the statistical model and provides more accurate results than a parametric model.

It is a further advantage that using the method a failure likelihood can be estimated for each component separately, rather than an estimate for the whole infrastructure, making the estimate both more accurate in terms of specificity and provides greater flexibility.

It is a further advantage that the estimate likelihood can account for a component failing multiple times, having increasing, decreasing or other complex pattern of failures. In this way the estimate can better account for the impact of factors that can increase and/or decrease the likelihood of failure.

The infrastructure may be a water supply system including a set of water pipes.

The infrastructure may also be a bridge including a set of bridge cables.

The infrastructure may also be a transportation network including roads, bridges and tunnels.

The method may further comprise grouping the history data by properties of the components of the infrastructure. The estimate for failure likelihood may be based on a particular component belonging to a particular grouping. Each grouping may have one or more properties.

If the infrastructure is a water supply system including a set of water pipes, the properties of the components of the infrastructure may comprise aging, location, pipe length, pipe wall thickness of the water pipes.

If the infrastructure is a bridge including a set of bridge cables that support the bridge, the properties of the components of the infrastructure may comprise aging, installation angle, cable length of the bridges cables.

If the infrastructure is a transportation network including a set of road segments, the properties of the components of the infrastructure may comprise aging, location, length, width of the roads.

The beta process may comprise a hierarchical beta process.

The use of the hierarchical beta process may take advantage of dependency among these components of infrastructures themselves and/or dependency among groupings of components.

The method may further comprise not fixing a mean parameter of the hierarchical beta process and fixing a concentration parameter of the hierarchical beta process.

The method may further comprise obtaining a posterior distribution of the mean parameter of the hierarchical beta process.

The method may further comprise not fixing a mean parameter of the hierarchical beta process and a concentration parameter of the hierarchical beta process.

Not fixing the mean parameter of the hierarchical beta process and the concentration parameter of the hierarchical beta process may provide more accurate simulation of the real world and as a result a more accurate estimate of the failure likelihood.

The method may further comprise obtaining a joint posterior distribution of the mean parameter and the concentration parameter of the hierarchical beta process.

The step of obtaining may comprise obtaining the joint posterior distribution using sparsity of the history data.

The use of sparsity of the history data may reduce computing complexity in obtaining the joint posterior distribution. It is a further advantage that the method is able to determine an estimate even when the history data is not complete.

The method may further comprise utilising Taylor expansion to approximate the joint posterior distribution of the mean parameter and the concentration parameter.

Approximation of the joint posterior distribution of the mean parameter and the concentration parameter by Taylor expansion may further reduce the computing complexity.

The method may further comprise approximating a numerical relationship between the mean parameter and the concentration parameter.

Approximation of the numerical relationship between the mean parameter and the concentration parameter may facilitate obtaining of a posterior distribution for a failure of one or more components of the infrastructure.

The method may further comprise obtaining a posterior distribution for a failure of one or more components of the infrastructure.

The step of estimating may comprise estimating the failure likelihood of the one or more components of the infrastructure from the posterior distribution for the failure of the one or more components of the infrastructure.

The method may further comprise causing an inspection of the infrastructure to be conducted based on the estimated failure likelihood.

The inspection of infrastructure may be conducted if the estimated failure likelihood indicates a possible future failure of the components.

The failure likelihood of each component of the infrastructure may comprise a mean of the posterior distribution for the failure of the component.

There is also provided a computer software program, including machine-readable instructions, when executed by a processor, causes the processor to perform the method of any one of the preceding claims.

There is further provided a computer system for estimating failure likelihood of components of an infrastructure, the system comprising a processor that is adapted to:
  access or receive history data representing prior failures of the infrastructure;
  apply the history data to a Bayesian nonparametric statistical model using a beta process; and
  estimate the failure likelihood of each components of the infrastructure from the Bayesian nonparametric statistical model.

Optional features of the method described above are also optional features of the software and computer system described here.

BRIEF DESCRIPTION OF THE DRAWINGS

At least one example of the invention will be described with reference to the accompanying drawings, in which:

FIG. 4 shows an exemplary data structure of prior failures of components of the infrastructure;

FIG. 5 shows a process for numerically estimating failure likelihood of components of the infrastructure according to an embodiment of the present invention; and FIG. 6 shows a process for numerically estimating failure likelihood of components of the infrastructure according to another embodiment of the present invention.

It should be noted that the same numeral indicates the same or similar element throughout the drawings.

BEST MODES OF THE INVENTION

Figure 1:
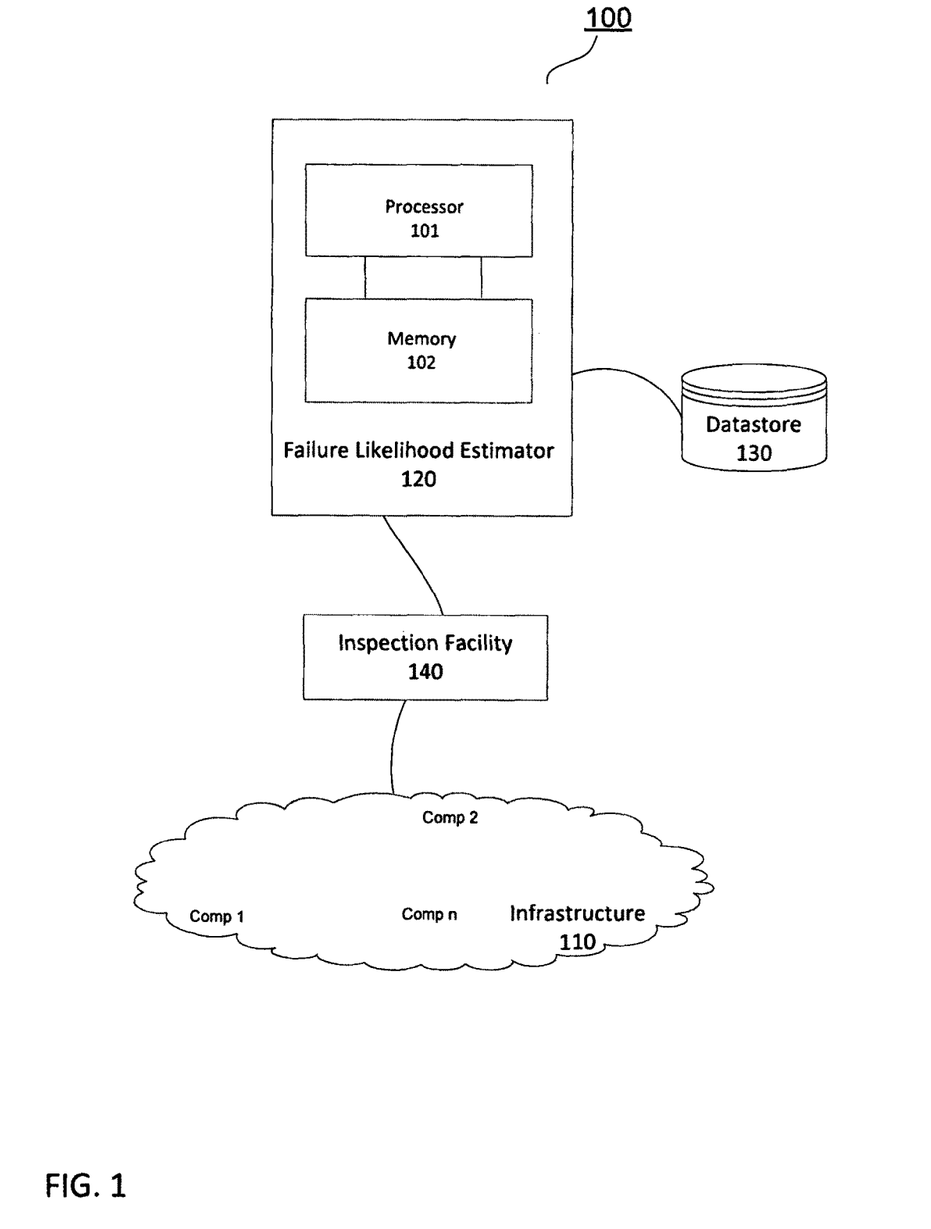
FIG. 1 shows a system having a failure likelihood estimator used to estimate failure likelihood of components of an infrastructure according to an embodiment of the present invention.

FIG. 1 shows a system 100 including an infrastructure 110, a failure likelihood estimator 120, a datastore 130 and an inspection facility 140. The infrastructure 110 is connected to the inspection facility 140, which conducts an inspection of the infrastructure 110 based on failure likelihood estimated by the failure likelihood estimator 120.

The failure likelihood in the present invention refers to likelihood that the components of the infrastructure 110 may fail in the future. The failure likelihood estimator 120 predicts a failure of the infrastructure 110 by estimating the failure likelihood of one or more components of the infrastructure 110.

The failure likelihood estimator 120 includes a processor 101 and memory 102. The processor 101 performs instructions stored in the memory 102 to estimate the failure likelihood of one or more components of the infrastructure 110. The failure likelihood estimator 120 is connected to the datastore 130 to receive or access history data of prior failures of the components. The data in the datastore 130 may be organised in the form of data structure such as a database. Although the infrastructure 110, the failure likelihood estimator 120, the datastore 130 and the inspection facility 140 are shown in FIG. 1 as separated entities connected via the links therebetween, an entity may be part of another entity. For example, the datastore 130 may be part of the failure likelihood estimator 120, or the inspection facility 140 may be part of the infrastructure 110. Moreover, the link between any two entities may be a physical link or a logical link. The link may also be one or more communication networks (not shown in FIG. 1). Such networks may for example comprise private networks, public networks, public secured networks, wired networks, wireless networks, Local Area Networks (LANs), Wide Area Networks (WANs), and any combination of the foregoing. In particular, the foregoing networks may be coupled via the Internet (not shown in FIG. 1). The connection relationship between entities in FIG. 1 is for exemplary purpose only, and there may be other forms of connection without departing from the idea of the invention.

Infrastructure

In the present invention, the infrastructure 110 is a network including a plurality of components that each performs a function, such as carry services, shown as the dashed lines in the infrastructure 110. For example, the infrastructure 110 may be a water supply system including a set of component water pipes that supplies water to the public. The infrastructure 110 may also be a bridge including a set of component bridge cables that support the bridge. The infrastructure 110 may also be a transportation network including component roads, bridges and tunnels that provide transportation services to the public. The infrastructure 110 may also take other forms where appropriate.

Whatever form the infrastructure 110 takes, the components for example the water pipes, the bridge cables or the bridges/roads/tunnels need to be inspected for possible failures automatically and/or manually by the inspection facility 140 to ensure the infrastructure 110 operates in a normal working condition.

The term "failure" in the present invention refers to a condition or status under which the components of the infrastructure cannot carry their normal functions or services. The types of failure are different for different infrastructure. For a water piper system, the failure of the components may include, but not limited to, pipe leaks, pipe blockages, etc. For a bridge, the failure of the components may include, but not limited to, broken cables, etc. For a transportation network, the failure of the components may include, but not limited to, road damages, traffic jam and/or incidents, etc. The application of the present invention is not intended to be limited to any specific type of failure.

Failure Likelihood Estimator

The failure likelihood estimator 120 including the processor 101 and the memory 102 is a computing device or part of a computing device that receives or accesses the history data from the datastore 130 to estimate failure likelihood of one or more components of the infrastructure 110 by performing the instructions stored in the memory 102.

The processor 101 included in the failure likelihood estimator 120 may be for example a general purpose processor, an application-specification integrate circuit (ASIC) or a field-programmable gate array (FPGA), etc. The processor 101 fetches and performs instructions stored in the memory 102. The memory 102 may be any type of volatile or non-volatile memory that can temporarily or permanently store software including machine-readable instructions, for example, RAM, ROM, EPROM, EEPROM, FLASH, a hard disk, a floppy disk, etc. The processor 101 also receives or accesses prior failures data of the components of the infrastructure 110 from the datastore 130 through the link between the failure likelihood estimator 120 and the datastore 130.

Although the failure likelihood estimator 120 is shown in FIG. 1 as a physical device, it may also be a computer program that includes machine-readable instructions running on a programmable device such as a programmable integrated circuit, a desktop, a laptop, a handset, etc., to perform the same function. Once the failure likelihood of each component is estimated by the failure likelihood estimator 120, the failure likelihood estimator 120 sends the failure likelihood or an indication indicating the failure likelihood to the inspection facility 140, which may automatically or manually conduct the inspection of the infrastructure 110 if the failure likelihood meets a typically predetermined criterion. The processor 101 can also cause the determined failure likelihood estimate of one or more components to be stored, such as in the datastore 130 or a different datastore, such as associated with the inspection facility 140. The processor 101 can also generate reports summarising the results of the likelihood estimates on one or more infrastructures and comparisons to the predefined criterion. These can also be stored in the datastore 130 and/or displayed on a display device (not shown) of the failure likelihood estimator 120.

Datastore

The datastore 130 stores the history data representing prior failures of the components of the infrastructure 110 during an observation period. The history data may be organised as shown in Table 1 of FIG. 4. In this example, the infrastructure 110 such as a water supply system comprises n components (i.e., water pipes), denoted by Comp 1, Comp 2, . . . , Comp n, respectively. The observation period is the past 24 years. If a component failed in a year in the past 24 years, the record for that year is "1"; otherwise, "0". For example, Comp 1 failed in Year 8, and then the corresponding record is shown as "1", in other years, Comp 1 worked in a normal working condition.

It should be noted that the data structure of the prior failures shown in Table 1 of FIG. 4 is not exclusive; there may be other forms of data structure that can be used to represent the prior failures of the components of the infrastructure 110 without departing from the idea of the invention. The data in the datastore 130 can be entered in the datastore 130 manually typically by the operator of the infrastructure 110 (typically remotely) or automatically by direct or indirect communication with a same or different computer that records incidents associated with the components of the infrastructure via a data interface therebetween (not shown in FIG. 1).

Inspection Facility

The inspection facility 140 is a facility that conducts the inspection of the infrastructure 110, specifically the components of the infrastructure 110 based on the failure likelihood estimated by the failure likelihood estimator 120. For example, the inspection facility 140 may prioritise inspection of the components by their respective failure likelihood to inspect such as components having failure likelihood greater than a threshold. The inspection conducted may be a manual inspection by a technician scheduled through the inspection facility 140 or an automatic inspection by performing a series of automatic actions or even a combination of the manual and automatic inspections, which depends on the specific configuration of the infrastructure 110.

Figure 2:
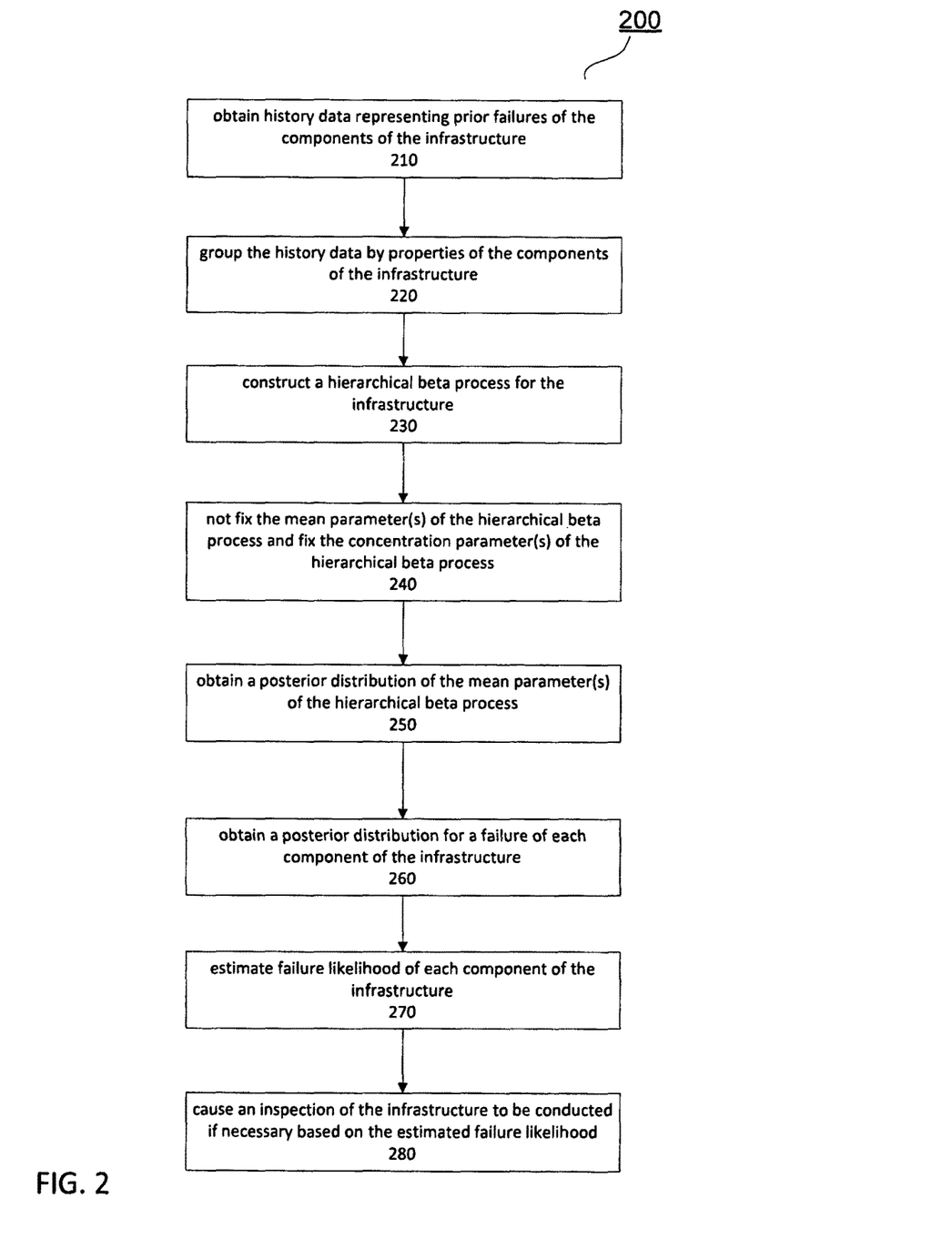
FIG. 2 is a flow chart for estimating failure likelihood of components of the infrastructure according to an embodiment of the present invention.

Now referring to FIG. 2, the process performed by the processor 101 of the failure likelihood estimator 120 to estimate the failure likelihood of each component of the infrastructure 110 is described according to an embodiment of the invention.

As described above, the processor 101 receives from the datastore 130 ("push") or accesses ("pull") 210 the history data representing prior failures of the components of the infrastructure 110.

Once the processor 101 obtains the history data, a beta process model denoted by $B \sim BP(c, B_0)$ is established by the processor 101 to model the overall operation of the infrastructure 110. In particular, the beta process, $B \sim BP(c, B_0)$, is a positive random measure on a space $\Omega$, where c, the concentration function, is a positive function over $\Omega$, and $B_0$, the base measure, is a fixed measure on $\Omega$. If $B_0$ is discrete, $B_0 = \Sigma_k q_k \delta_{w_k}$, then B has atoms at same locations $B = \Sigma_k p_k \delta_{w_k}$, where $p_k \sim \text{Beta}(c(w_k)q_k, c(w_k)(1-q_k))$, and each $q_k \in [0,1]$. An observation data X could be modelled by a Bernoulli process with the measure B, $X \sim \text{BeP}(B)$, where $X = \Sigma_k z_k \delta_{w_k}$, and each $z_k$ is a Bernoulli variable, $z_k \sim \text{Ber}(p_k)$.

In practice, some of the components of the infrastructure 110 may have similar properties. For example, if the infrastructure 110 is a water supply system including a set of water pipes, some of the water pipes may have similar properties such as aging, location, pipe length, pipe wall thickness, etc. If the infrastructure 110 is a bridge including a set of bridge cables that support the bridge, some of the bridge cables may also have similar properties such as aging, installation angle, cable length, etc. Other properties include type, material, size, previous failures, soil, pressure, location, weather and traffic conditions. Therefore, these components having similar properties are grouped 220 together to utilise the dependency in these pipes so as to more accurately estimate the failure likelihood of the components.

In this embodiment, the components are grouped in K groups by their properties with each group having $n_k$ components. Therefore, the i-th component in the k-th group can be denoted by a pair of number (k,i). The history data for component (k,i) is denoted as $z_{k,i,j}$, $j=1, \ldots, m_{k,i}$, where $m_{k,j}$ is the observation period for component (k,i). $z_{k,i,j}=1$ means the component failed in j-th year; otherwise $z_{k,i,j}=0$. The goal of the present invention is to estimate the mean of posterior failure probability of component (k,i) of the infrastructure 110 given the history data $z_{k,i,j}$ to measure the failure likelihood of component (k,i). There may be other measures for the failure likelihood of component (k,i) without departing from the idea of the invention.

A hierarchical beta process is then constructed 230 by the processor 101 to model the grouped history data. Within each group, the atoms and the associated atom usage are modelled by a beta process. Meanwhile a beta process prior is shared by all the groups. In the present invention, $\pi_{k,i}$ is defined as the prior failure probability of component (k,i) of the infrastructure 110. The hierarchical beta process is constructed as follows, $q_k \sim \text{Beta}(c_0 q_0, c_0(1-q_0))$, where $k=1, 2, \ldots, K$ $\pi_{k,i} \sim \text{Beta}(c_k q_k, c_k(1-q_k))$, where $i=1, \ldots, n_k$ $z_{k,i,j} \sim \text{Ber}(\pi_{k,i})$, where $j=1, \ldots, m_{k,i}$ \hfill (1)

Here $q_k$ and $c_k$ are the mean and concentration parameters for the k-th group, $q_0$ and $c_0$ are hyper parameters for the hierarchical beta process. In the hierarchical beta process, a set of $\{q_k\}$ are used to describe average failure probability of the components in the k-th group, while the concentration parameter $c_k$ is fixed for the k-th group 240, so a joint posterior distribution of $q_k$ and $\pi_{k,1:n_k}$ given the history data is:

$$p(q_k, \pi_{k,1:n_k} | z_{k,1:n_k}) \propto p(q_k, \pi_{k,1:n_k}, z_{k,1:n_k}) = \quad (2)$$

$$p(q_k) \prod_i \left[ p(\pi_{k,i} | q_k) \prod_j p(z_{k,i,j} | \pi_{k,i}) \right] \propto (1-q_k)^{c_0(1-q_0)-1} q_k^{c_0 q_0 -1}$$

$$\prod_i \left[ \frac{\pi_{k,i}^{c_k q_k -1 + \Sigma_j z_{k,i,j}} (1-\pi_{k,i})^{c_k(1-q_k)-1+m_{k,i}-\Sigma_j z_{k,i,j}}}{\Gamma(c_k q_k) \Gamma(c_k(1-q_k))} \right],$$

where $\pi_{k,1:n_k} = \{\pi_{k,i} | i=1, \ldots, n_k\}$ and $z_{k,1:n_k} = \{z_{k,i} | i=1, \ldots, n_k\}$ A posterior distribution of the mean parameter of the hierarchical beta process given the history data can be obtained 250 by marginalizing out $\pi_{k,i}$, $$p(q_k | z_{k,1:n_k}) \propto p(q_k, z_{k,1:n_k}) = \quad (3)$$

$$p(q_k) \prod_i \left[ \int p(\pi_{k,i} | q_k) p(z_{k,i} | \pi_{k,i}) d\pi_{k,i} \right] \propto q_k^{c_0 q_0 -1}(1-q_k)^{c_0(1-q_0)-1}$$

$$\prod_i \frac{\Gamma(c_k q_k + \Sigma_j z_{k,i,j}) \Gamma(c_k(1-q_k) + m_{k,i} - \Sigma_j z_{k,i,j})}{\Gamma(c_k q_k) \Gamma(c_k(1-q_k))}.$$

It can be known from (2) and (3) for each $\pi_{k,i}$, given $q_k$, $$p(\pi_{k,i} | q_k, z_{k,1:n_k}) = \frac{p(q_k, \pi_{k,i} | z_{k,1:n_k})}{p(q_k | z_{k,1:n_k})} = \quad (4)$$

$$\frac{p(q_k) p(\pi_{k,i} | q_k) p(z_{k,i} | \pi_{k,i})}{\prod_{l \neq i} \left[ \int p(\pi_{k,l} | q_k) p(z_{k,l} | \pi_{k,l}) d\pi_{k,l} \right]} \propto$$

$$\pi_{k,i}^{c_k q_k -1 + \Sigma_j z_{k,i,j}} (1-\pi_{k,i})^{c_k(1-q_k)-1+m_{k,i}-\Sigma_j z_{k,i,j}}$$

Hence given $q_k$, $\pi_{k,i} | q_k, z_{k,i} \sim \text{Beta}(c_k q_k + \Sigma_j z_{k,i,j}, c_k(1-q_k) + m_{k,i} - \Sigma_j z_{k,i,j})$ \hfill (5)

The posterior distribution for the failure probability of component (k,i) of the infrastructure 110 given the history data $z_k$, can be obtained 260 by marginalizing out $q_k$.

$$p(\pi_{k,i} | z_{k,1:n_k}) = \quad (6)$$

$$\int p(q_k, \pi_{k,i} | z_{k,1:n_k}) dq_k = \int p(q_k | z_{k,1:n_k}) p(\pi_{k,i} | q_k, z_{k,i}) dq_k$$

where the posterior distributions $p(q_k | z_{k,1:n_k})$ and $p(\pi_{k,i} | q_k, z_{k,i})$ are formulated by equations (3) and (5), respectively.

Based on equation (6), the mean of posterior failure probability of component (k,i) of the infrastructure 110 given the history data, i.e., the failure likelihood of component (k,i) given the history data, is numerically estimated 270 from the process shown in Table 2 of FIG. 5. It should be noted that in Table 2 of FIG. 5, $p(q_k | z_{k,1:n_k})$ is approximated by a set of samples from equation (3) to simplify the computation, and the concentration parameters $c_k$ are fixed during the process. Then the mean of each $\pi_{k,i}$ given the history data are estimated through the sample based approximation.

Once the failure likelihood for each component (k, i) of the infrastructure 110 given the history data is estimated, the estimated failure likelihood or an indication indicating the estimated failure likelihood is then transmitted from the failure likelihood estimator 120 to the inspection facility 140. If the estimated failure likelihood is for example above a threshold, then the inspection facility 140 may cause 280, in an automatic or manual way, the inspection of the infrastructure 110, particularly, component (k, j) to assess its condition. For example, the inspection facility 140 may send an email to a technician indicating that an inspection of the infrastructure 110 is needed and an inspection time has been arranged for the inspection. Then the technician will conduct the physical inspection of the infrastructure 110 at the arranged inspection time. The inspection facility 140 may also conduct an automatic inspection by for example starting a predetermined computer program that take a series of automatic actions to inspect the infrastructure 110. The inspection of the infrastructure 110 may also be a combination of the manual and automatic inspections. The specific form of the inspection depends on the specific configuration of the infrastructure 110.

As described above, the concentration parameters are fixed in this embodiment. However, both the mean and concentration parameters are important parameters that impact the underlying beta distribution representing the overall operation of the infrastructure 110. In other words, even with the same mean parameter, the distribution may vary dramatically with the concentration parameter. When the value of the concentration parameter is large, the distribution highly concentrates to its mean value. When the value is small, the distribution spreads over a big range and sometimes even becomes bimodal.

With this in mind, another embodiment is described with reference to FIG. 3 in which both the mean and concentration parameters are not fixed to estimate the failure probability of component (k, j) of the infrastructure 110 given the history data.

Figure 3:
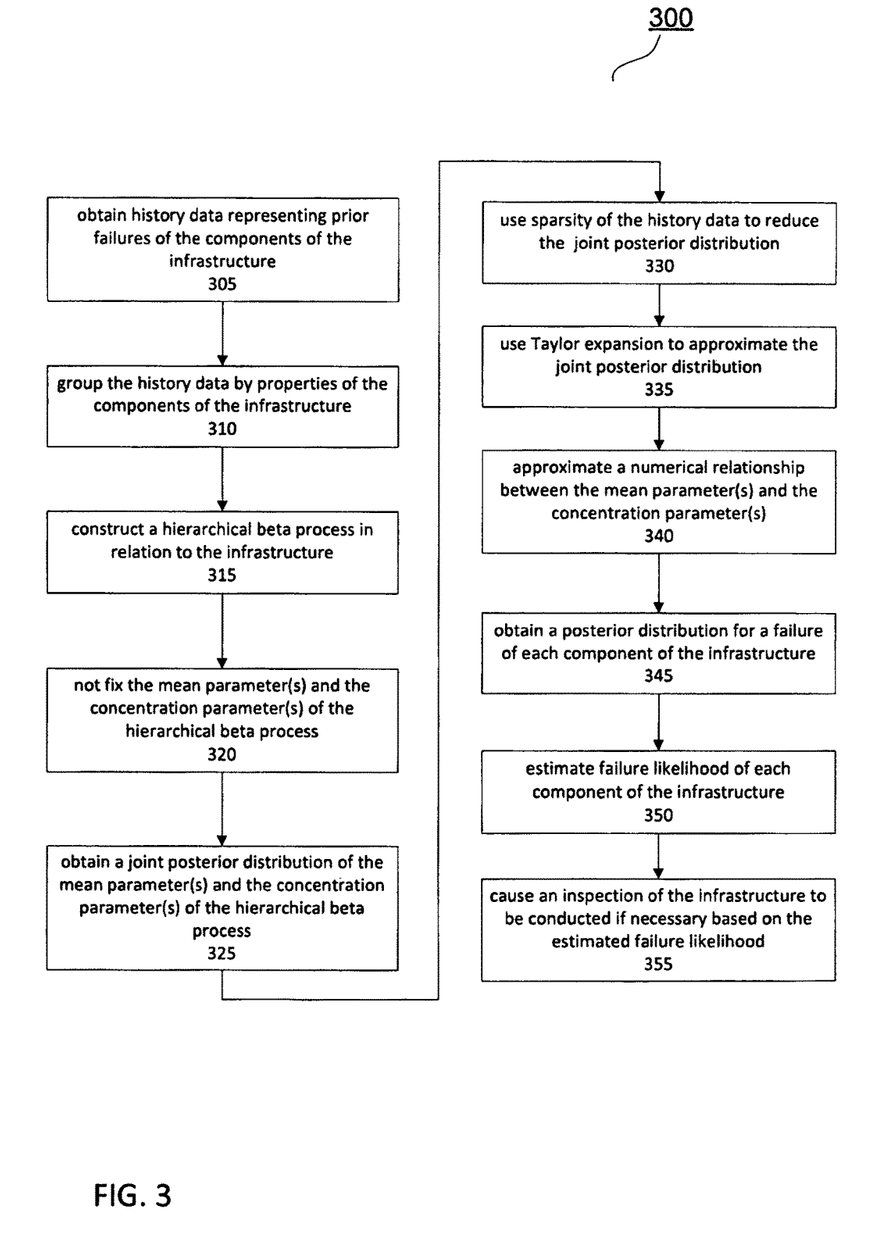
FIG. 3 is a flow chart for estimating failure likelihood of components of the infrastructure according to another embodiment of the present invention.

In FIG. 3, steps 305, 310 and 315 are similar to steps 210, 220 and 230 in FIG. 2. In step 320, however, both the mean and concentration parameters not fixed, so a joint posterior distribution of $q_k$, $c_k$, $\pi_{k,1:n_k}$ given the history data becomes:

$$p(q_k, c_k, \pi_{k,1:n_k} | z_{k,1:n_k}) \propto p(q_k, c_k, \pi_{k,1:n_k}, z_{k,1:n_k}) = p(q_k) p(c_k) \Pi_i [p(\pi_{k,i} | q_k, c_k) \Pi_j p(z_{k,i,j} | \pi_{k,i})] \quad (7)$$

Assuming non-informative prior for $c_k$ and marginalize out $\pi_{k,1:n_k}$, a joint posterior distribution of $q_k$ and $c_k$ given the history data can be obtained 325, $$p(q_k, c_k \mid z_{k,1:n_k}) \propto q_k^{c_0 q_0 - 1}(1-q_k)^{c_0(1-q_0)-1} \qquad (8)$$

$$\prod_i \frac{\Gamma(c_k)\Gamma(c_k q_k + \Sigma_j z_{k,i,j})\Gamma(c_k(1-q_k) + m_{k,i} - \Sigma_j z_{k,i,j})}{\Gamma(c_k + m_{k,i})\Gamma(c_k q_k)\Gamma(c_k(1-q_k))}$$

It can be seen from the above that the computational complexity of equation (8) makes it hard to estimate the joint posterior distribution of $q_k$ and $c_k$.

However, as shown in Table 1 of FIG. 4, the history data are usually quite sparse within the observation period. In practice, most components never fail or fail just once during the observation period (i.e. $\Sigma_j z_{k,i,j} \leq 1$). It can be seen that under such situation the computational complexity could be greatly reduced by taking advantage of sparsity of the history data. Denote $s_{k,i} = \Sigma_j z_{k,i,j}$, according to the property of Gamma function, for sparse history data, the joint posterior distribution of $q_k$ and $c_k$ is reduced 330 to $$p(q_k, c_k \mid z_{k,1:n_k}) \propto \qquad (9)$$

$$q_k^{c_0 q_0 - 1}(1-q_k)^{c_0(1-q_0)-1} \prod_i \left[ \frac{(c_k q_k)^{s_{k,i}} \prod_{l=0}^{m_{k,i}-s_{k,i}-1}(c_k(1-q_k)+l)}{\prod_{l=0}^{m_{k,i}-1}(c_k+l)} \right]$$

Using Taylor expansion, the joint posterior distribution can be approximated 335 by $$p(q_k, c_k \mid z_{k,1:n_k}) \propto q_k^{c_0 q_0 - 1}(1-q_k)^{c_0(1-q_0)-1} \qquad (10)$$

$$\prod_i \left[ \left( \frac{c_k q_k}{c_k + m_{k,i} - 1} \right)^{s_{k,i}} (1-q_k)^{\sum_{l=0}^{m_{k,i}-1-s_{k,i}} \frac{c_k}{l+c_k}} \right]$$

Hence given $c_k$, $$p(q_k \mid c_k, z_{k,1:n_k}) \propto p(q_k, c_k \mid z_{k,1:n_k}) \propto \qquad (11)$$

$$q_k^{c_0 q_0 + \Sigma_i s_{k,i} - 1}(1-q_k)^{c_0(1-q_0)+\Sigma_i \Sigma_{l=0}^{m_{k,i}-1-s_{k,i}} \frac{c_k}{l+c_k} - 1}$$

Thus the posterior distribution of $q_k$ could be approximated by a beta distribution as well $$p(q_k \mid c_k, z_{k,1:n_k}) \approx \qquad (12)$$

$$\text{Beta}\left(c_0 q_0 + \Sigma_i s_{k,i}, \, c_0(1-q_0) + \sum_i \sum_{l=0}^{m_{k,i}-1-s_{k,i}} \frac{c_k}{l+c_k}\right).$$

The computational complexity can be further reduced when there is sufficient number of components in a group. Usually $n_k \gg 1$ for each group, it can be known that $\text{Var}(q_k \mid c_k, z_{k,1:n_k}) \ll 1$ since $$\text{Var}(q_k \mid c_k, z_{k,1:n_k}) \leq \frac{1}{4\left(c_0 + \sum_i z_{k,i} + n_k\right)}.$$

A numerical relationship between the mean parameter and the concentration parameter is then approximated 340 by $$q_k \approx \frac{c_0 q_0 + \sum_i s_{k,i}}{c_0 + \sum_i s_{k,i} + \sum_i \sum_{l=0}^{m_{k,i}-1-s_{k,i}} \frac{c_k}{l+c_k}} \qquad (13)$$

Given both $q_k$ and $c_k$, combining with (7)

$$p(\pi_{k,i} \mid q_k, c_k, z_{k,1:n_k}) = \frac{p(q_k, c_k, \pi_{k,i} \mid z_{k,1:n_k})}{p(q_k, c_k \mid z_{k,1:n_k})} = \qquad (14)$$

$$\frac{p(q_k)p(c_k)p(\pi_{k,i} \mid q_k, c_k)p(z_{k,i} \mid \pi_{k,i}) \prod_{l \neq i} \left[ \int p(\pi_{k,l} \mid q_k, c_k)p(z_{k,l} \mid \pi_{k,l})d\pi_{k,l} \right]}{p(q_k)p(c_k) \prod_l \left[ \int p(\pi_{k,l} \mid c_k)p(z_{k,l} \mid \pi_{k,l})d\pi_{k,l} \right]} \propto$$

$$\pi_{k,i}^{c_k q_k - 1 + \Sigma_j z_{k,i,j}}(1-\pi_{k,i})^{c_k(1-q_k)-1+m_{k,i}-\Sigma_j z_{k,i,j}}.$$

Hence for each $\pi_{k,i}$, $$\pi_{k,i} \mid q_k, c_k, z_{k,i} \sim \text{Beta}(c_k q_k + \Sigma_j z_{k,i,j}, \, c_k(1-q_k) + m_{k,i} - \Sigma_j z_{k,i,j}). \qquad (15)$$

The posterior distribution for each $\pi_{k,i}$ given the history data can be obtained 345 by marginalizing out $q_k$ and $c_k$, $$p(\pi_{k,i} \mid z_{k,1:n_k}) = \int p(q_k, c_k, \pi_{k,i} \mid z_{k,1:n_k}) dq_k dc_k = \qquad (16)$$

$$\int p(q_k, c_k \mid z_{k,1:n_k}) p(\pi_{k,i} \mid q_k, c_k, z_{k,i}) dq_k dc_k,$$

where the posterior distributions $p(q_k, c_k \mid z_{k,1:n_k})$ and $p(\pi_{k,i} \mid q_k, c_k, z_{k,i})$ are formulated by equations (10) and (15), respectively.

Based on equation (16), similar to the process shown in Table 2 of FIG. 5, the mean of posterior failure probability of component (k,i) of the infrastructure 110 given the history data, i.e., the failure likelihood of component (k,i) given the history data, is numerically estimated 350 from the process shown in Table 3 of FIG. 6. It should be noted that in Table 3 of FIG. 6, $p(q_k, c_k \mid z_{k,1:n_k})$ is approximated by a set of samples from equation (10) to simplify the computation, and the mean parameters $q_k$ and the concentration parameters $c_k$ are not fixed during the process. Then the mean of each $\pi_{k,i}$ given the history data could be estimated through the sample based approximation.

Once the failure likelihood for each component of the infrastructure 110 is estimated, the estimated failure likelihood or an indication indicating the failure likelihood is then transmitted from the failure likelihood estimator 120 to the inspection facility 140. If the estimated failure likelihood is for example above the threshold, then the inspection facility 140 may conduct 355, in an automatic or manual way, the inspection of the infrastructure 110, particularly, component (k, j) to assess its condition. For example, the inspection facility 140 may send an email to a technician indicating that an inspection of the infrastructure 110 is needed and an inspection time has been arranged for the inspection.

Then the technician will conduct the physical inspection of the infrastructure 110 at the arranged inspection time. The inspection facility 140 may also conduct an automatic inspection by for example starting a predetermined computer program that take a series of automatic actions to inspect the infrastructure 110. The inspection of the infrastructure 110 may also be a combination of the manual and automatic inspections. The specific form of the inspection depends on the specific configuration of the infrastructure 110.

It should be understood that the techniques of the present disclosure might be implemented using a variety of technologies.

For example, the method could be performed dynamically such if and when updates to the historical data are available, these are applied to the method to update the model. In this way the historical data may be simply only the most recent data and the step of applying the history data comprises only applying the update to in turn only update the model.

The history data may relate to multiple different infrastructures having similar components with similar properties.

For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "obtaining" or "computing" or "storing", "receiving" or "determining" or "displaying" or "configuring" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A computer-implemented method for ensuring operation of a physical infrastructure in a working condition comprising:
   accessing or receiving history data representing prior failures of components of the physical infrastructure;
   grouping the history data by properties of the components of the physical infrastructure into groups;
   applying the history data to a Bayesian nonparametric statistical model using a hierarchical beta process to model failure likelihood of components within each group;
   estimating the failure likelihood of a selected component of the components of the physical infrastructure from the Bayesian nonparametric statistical model, the estimating of the failure likelihood being based on the selected component belonging to a particular group of the groups;
   causing an inspection of the selected component of the physical infrastructure to be conducted if the estimated failure likelihood for the selected component is greater than a threshold; and
   causing preventative repairs and/or renewal of the selected component of the physical infrastructure based on the inspection to ensure that the physical infrastructure operates in a normal working condition.

2. The computer-implemented method according to claim 1, the method further comprising not fixing a mean parameter of the hierarchical beta process and fixing a concentration parameter of the hierarchical beta process.

3. The computer-implemented method according to claim 2, the method further comprising obtaining a posterior distribution of the mean parameter of the hierarchical beta process.

4. The computer-implemented method according to claim 1, the method further comprising not fixing a mean parameter of the hierarchical beta process and a concentration parameter of the hierarchical beta process.

5. The computer-implemented method according to claim 4, the method further comprising obtaining a joint posterior distribution of the mean parameter and the concentration parameter of the hierarchical beta process.

6. The computer-implemented method according to claim 5, the step of obtaining comprises obtaining the joint posterior distribution using sparsity of the history data.

7. The computer-implemented method according to claim 6, the method further comprising utilising Taylor expansion to approximate the joint posterior distribution of the mean parameter and the concentration parameter.

8. The computer-implemented method according to claim 1, wherein the method further comprising storing the estimated failure likelihood of one or more component.

9. The computer-implemented method according to claim 1, the method further comprising obtaining a posterior distribution for a failure of each component of the infrastructure.

10. The computer-implemented method according to claim 9, the step of estimating comprises estimating the failure likelihood of each component of the infrastructure from the posterior distribution for the failure of each component of the infrastructure.

11. The computer-implemented method according to claim 1, wherein causing an inspection of the infrastructure to be conducted based on the estimated failure likelihood comprises causing an inspection of the infrastructure to be conducted if the estimated failure likelihood is greater than a threshold.

12. A non-transitory computer readable medium, including computer executable instructions stored thereon, that when executed by a processor, causes the processor to perform the method of claim 1.

13. A computer system for ensuring operation of a physical infrastructure in a working condition, the system comprising a processor that is adapted to:
   access or receive history data representing prior failures of components of the physical infrastructure;
   group the history data by properties of the components of the physical infrastructure into groups;
   apply the history data to a Bayesian nonparametric statistical model using a hierarchical beta process to model failure likelihood of components within each group;
   estimate the failure likelihood of each component of the physical infrastructure from the Bayesian nonparametric statistical model, the estimating of the failure likelihood of each component being based on the respective component belonging to a particular group of the groups;

cause an inspection of a selected component of the physical infrastructure to be conducted if the estimated failure likelihood of the selected component is greater than a threshold; and cause preventative repairs and/or renewal of the selected component of the physical infrastructure based on the inspection to ensure that the physical infrastructure operates in a normal working condition.

* * * * *

UNITED STATES PATENT AND TRADEMARK OFFICE
CERTIFICATE OF CORRECTION

PATENT NO. : 10,402,738 B2
APPLICATION NO. : 14/649449
DATED : September 3, 2019
INVENTOR(S) : Zhidong Li et al.

Page 1 of 2

It is certified that error appears in the above-identified patent and that said Letters Patent is hereby corrected as shown below:

In the Specification

Column 7, equation (2) Should Read As Follows:

$$p(q_k, \pi_{k,1:n_k} | z_{k,1:n_k}) \propto p(q_k, \pi_{k,1:n_k}, z_{k,1:n_k})$$
$$= p(q_k) \prod_i [p(\pi_{k,i}|q_k) \prod_j p(z_{k,i,j}|\pi_{k,i})] \quad (2)$$
$$\propto (1-q_k)^{c_0(1-q_0)-1} q_k^{c_0 q_0 - 1} \prod_i \left[\frac{\pi_{k,i}^{c_k q_k - 1 + \Sigma_j z_{k,i,j}} (1-\pi_{k,i})^{c_k(1-q_k)-1+m_{k,i}-\Sigma_j z_{k,i,j}}}{\Gamma(c_k q_k)\Gamma(c_k(1-q_k))}\right],$$

Column 7, equation (3) Should Read As Follows:

$$p(q_k|z_{k,1:n_k}) \propto p(q_k, z_{k,1:n_k}) = p(q_k) \prod_i [\int p(\pi_{k,i}|q_k) p(z_{k,i}|\pi_{k,i}) d\pi_{k,i}]$$
$$\propto q_k^{c_0 q_0 - 1}(1-q_k)^{c_0(1-q_0)-1} \prod_i \frac{\Gamma(c_k q_k + \Sigma_j z_{k,i,j})\Gamma(c_k(1-q_k)+m_{k,i}-\Sigma_j z_{k,i,j})}{\Gamma(c_k q_k)\Gamma(c_k(1-q_k))}. \quad (3)$$

Column 7, equation (4) Should Read As Follows:

$$p(\pi_{k,i}|q_k, z_{k,1:n_k}) = \frac{p(q_k, \pi_{k,i}|z_{k,1:n_k})}{p(q_k|z_{k,1:n_k})}$$
$$= \frac{p(q_k)p(\pi_{k,i}|q_k)p(z_{k,i}|\pi_{k,i}) \prod_{l \neq i} [\int p(\pi_{k,l}|q_k)p(z_{k,l}|\pi_{k,l}) d\pi_{k,l}]}{p(q_k) \prod_l [\int p(\pi_{k,l}|q_k)p(z_{k,l}|\pi_{k,l}) d\pi_{k,l}]} \quad (4)$$
$$\propto \pi_{k,i}^{c_k q_k - 1 + \Sigma_j z_{k,i,j}} (1 - \pi_{k,i})^{c_k(1-q_k)-1+m_{k,i}-\Sigma_j z_{k,i,j}}$$

Column 7, Line 67 Should Read As Follows:
data $z_{k,i}$ can be obtained 260 by marginalizing out $q_k$.

Column 9, equation (8) Should Read As Follows:

$$p(q_k, c_k|z_{k,1:n_k}) \propto q_k^{c_0 q_0 - 1}(1-q_k)^{c_0(1-q_0)-1} \prod_i \frac{\Gamma(c_k)\Gamma(c_k q_k + \Sigma_j z_{k,i,j})\Gamma(c_k(1-q_k)+m_{k,i}-\Sigma_j z_{k,i,j})}{\Gamma(c_k + m_{k,i})\Gamma(c_k q_k)\Gamma(c_k(1-q_k))} \quad (8)$$

Column 9, Line 16 Should Read As Follows:
history data. Denote $s_{k,i} = \Sigma_j z_{k,i,j}$, according to the property of Signed and Sealed this
Fifth Day of May, 2020

Andrei Iancu
*Director of the United States Patent and Trademark Office*

CERTIFICATE OF CORRECTION (continued)
U.S. Pat. No. 10,402,738 B2

Column 9, equation (9) Should Read As Follows:

$$p(q_k, c_k | z_{k,1:n_k}) \propto q_k^{c_0 q_0 - 1}(1 - q_k)^{c_0(1-q_0)-1} \prod_i \left[\frac{(c_k q_k)^{s_{k,i}} \prod_{l=0}^{m_{k,i}-s_{k,i}-1}(c_k(1-q_k)+l)}{\prod_{l=0}^{m_{k,i}-1}(c_k+l)}\right] \quad (9)$$

Column 9, equation (10) Should Read As Follows:

$$p(q_k, c_k | z_{k,1:n_k}) \propto q_k^{c_0 q_0 - 1}(1 - q_k)^{c_0(1-q_0)-1} \prod_i \left[\left(\frac{c_k q_k}{c_k + m_{k,i} - 1}\right)^{s_{k,i}} (1-q_k)^{\sum_{l=0}^{m_{k,i}-1-s_{k,i}} \frac{c_k}{l+c_k}}\right] \quad (10)$$

Column 9, equation (12) Should Read As Follows:

$$p(q_k | c_k, z_{k,1:n_k}) \approx \text{Beta}\left(c_0 q_0 + \sum_i s_{k,i}, c_0(1-q_0) + \sum_i \sum_{l=0}^{m_{k,i}-1-s_{k,i}} \frac{c_k}{l+c_k}\right). \quad (12)$$

Column 10, equation (14) Should Read As Follows:

$$p(\pi_{k,i} | q_k, c_k, z_{k,1:n_k}) = \frac{p(q_k, c_k, \pi_{k,i} | z_{k,1:n_k})}{p(q_k, c_k | z_{k,1:n_k})}$$

$$= \frac{p(q_k)p(c_k)p(\pi_{k,i}|q_k,c_k)p(z_{k,i}|\pi_{k,i}) \prod_{l \neq i}[\int p(\pi_{k,l}|q_k,c_k)p(z_{k,l}|\pi_{k,l})d\pi_{k,l}]}{p(q_k)p(c_k) \prod_l [\int p(\pi_{k,l}|q_k,c_k)p(z_{k,l}|\pi_{k,l})d\pi_{k,l}]} \quad (14)$$

$$\propto \pi_{k,i}^{c_k q_k - 1 + \sum_j z_{k,i,j}}(1 - \pi_{k,i})^{c_k(1-q_k)-1+m_{k,i}-\sum_j z_{k,i,j}}.$$